Oct. 3, 1944.  R. B. P. CRAWFORD  2,359,624
AIR CONDITIONING SYSTEM
Original Filed March 3, 1939    3 Sheets-Sheet 2

Inventor
Robert B. P. Crawford
By George H. Fisher
Attorney

Patented Oct. 3, 1944

2,359,624

UNITED STATES PATENT OFFICE 2,359,624

AIR CONDITIONING SYSTEM

Robert B. P. Crawford, Miami, Fla., assignor to Minneapolis-Honeywell Regulator Company, Minneapolis, Minn., a corporation of Delaware Original application March 3, 1939, Serial No. 259,561. Divided and this application December 13, 1941, Serial No. 422,829

6 Claims. (Cl. 261—39)

This invention relates to air conditioning systems for maintaining desired air conditions within an enclosure.

This application is a division of my previously filed application Serial No. 259,561, filed March 3, 1939, now Patent No. 2,286,605.

An object of this invention is to provide an air conditioning system having two stages of cooling, one primarily for sensible cooling and the other primarily for latent cooling, along with a stage of reheating wherein the heat dissipated by the reheating stage assists the cooling action performed by the latent cooling stage.

Another object of this invention is to provide a novel cooling tower for dissipating in a more economical manner the heat absorbed by the cooling apparatus of an air conditioning system, and particularly where the air conditioning system is of the two-stage type with reheat as set forth above.

Another object is to provide a cooling tower having increased efficiency wherein the spray water is introduced at level in the tower where the wet bulb temperature of the air is the same as the temperature of the spray water.

Another object is to provide automatic controls for accomplishing the preceding object.

Further objects of this invention reside in the structure and sequence of operation of the air conditioning system of this invention.

Another object of this invention is to provide automatic control systems for the air conditioning system of this invention whereby the sequences of operation thereof may be automatically controlled.

Figure 1:
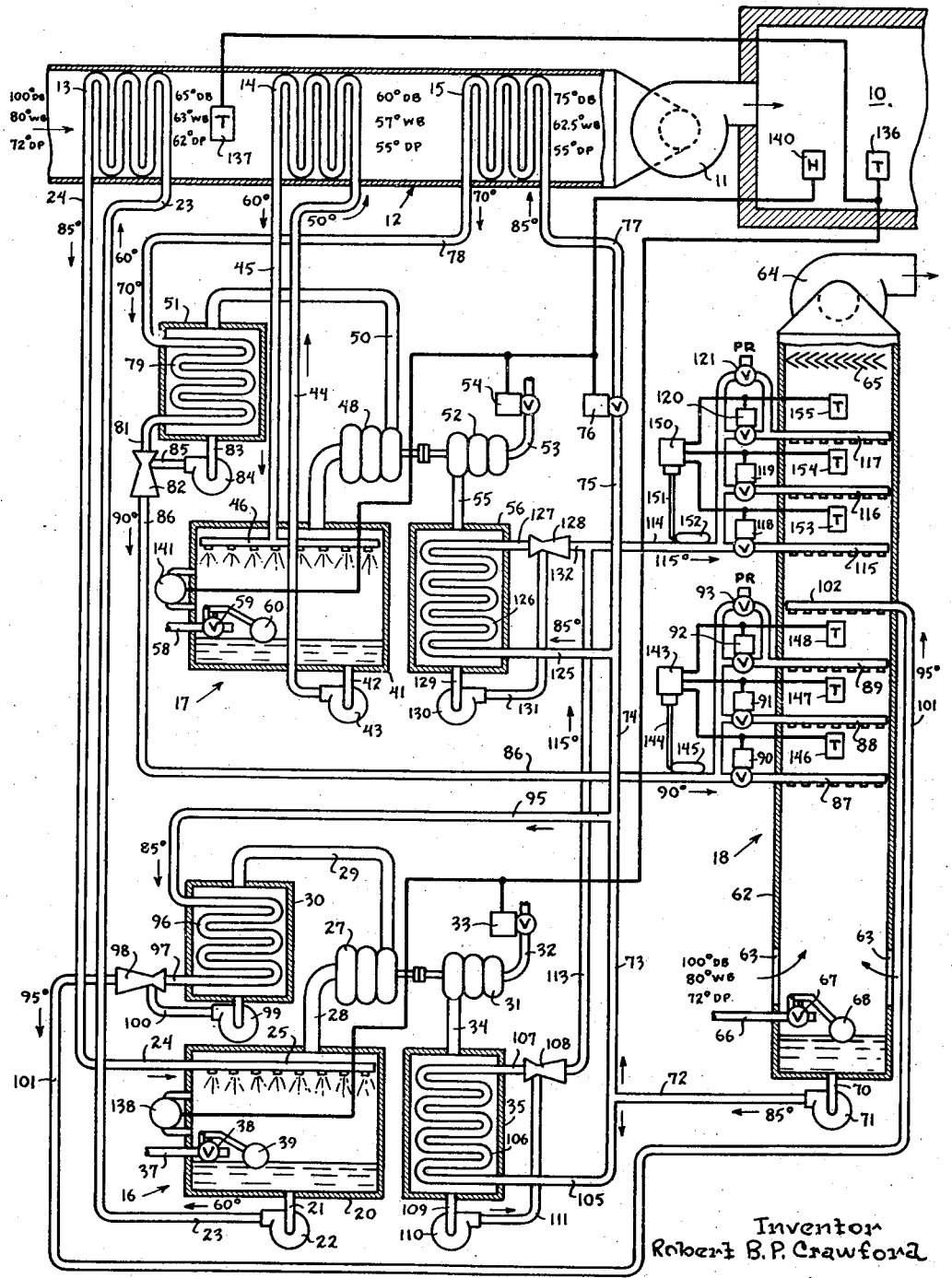
Figure 2:
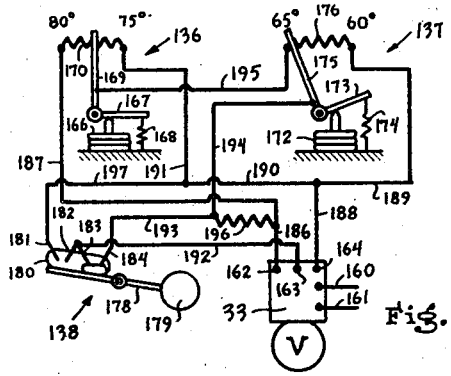
Figure 3:
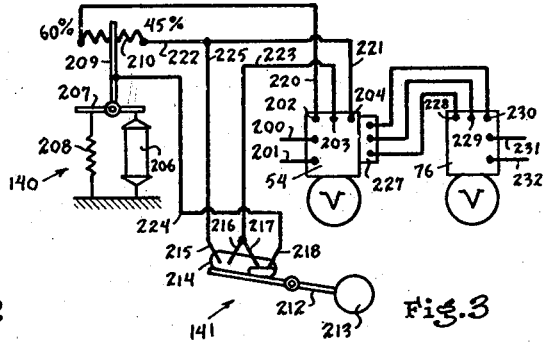
Figure 4:
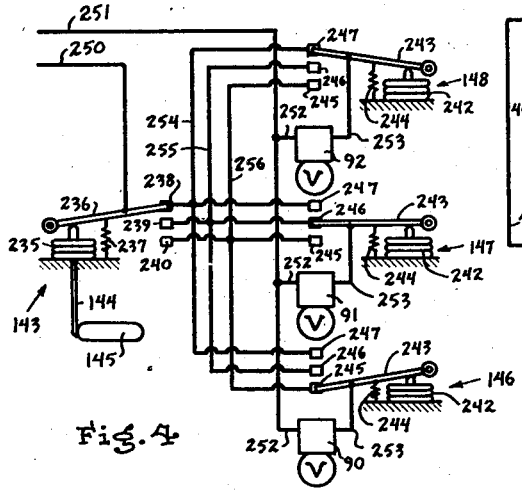
Figure 5:
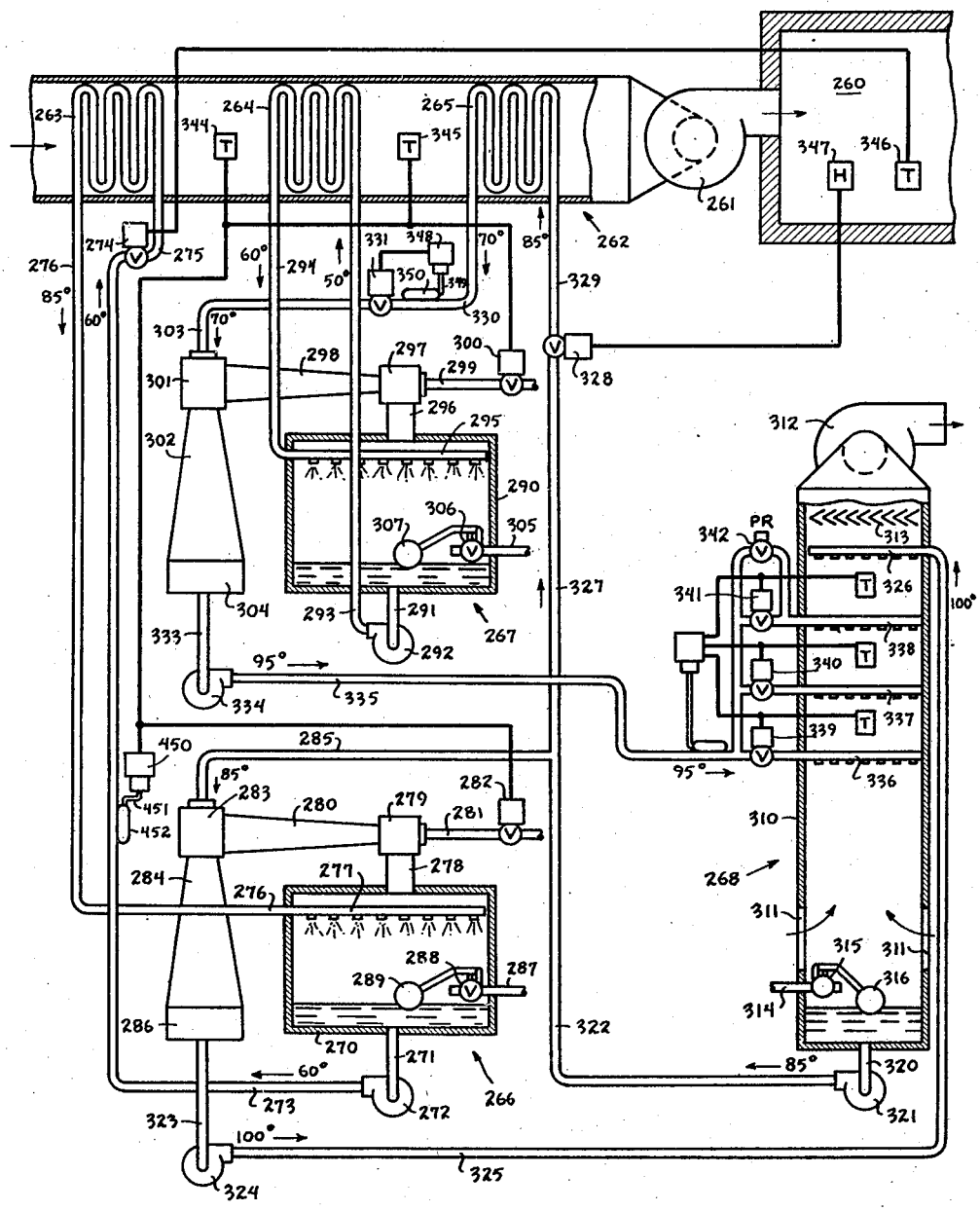

Other objects and advantages will become apparent to those skilled in the art upon reference to the accompanying specification, claims and drawings, in which Figure 1 is a diagrammatic illustration of one form of this invention, Figures 2, 3, and 4 are diagrammatic illustrations of control arrangements utilized in Figure 1, Figure 5 is a diagrammatic illustration of another form of this invention, and Figures 6, 7, 8, and 9 are diagrammatic illustrations of control arrangements utilized in Figure 5.

Referring now to Figure 1, an enclosure to be air conditioned is designated at 10. A fan 11 draws air through an air conditioning unit generally designated at 12 and discharges conditioned air into the enclosure 10 for air conditioning purposes. Fresh air, return air, or a mixture of fresh air and return air enters the air conditioning unit 12 and passes progressively over a precooling coil 13, an after cooling coil 14, and a reheat coil 15. For purposes of illustration it is assumed that outside air is utilized for conditioning purposes and under maximum load conditions it is assumed that this outside air has a dry bulb temperature of 100°, a wet bulb temperature of 80°, and a dew-point temperature of 72°. It is also assumed that the precooling coil 13 is so selected and constructed that it cools the air to a condition wherein the dry bulb temperature is 65°, the wet bulb temperature is 63°, and the dew-point temperature is 62°. Further it is assumed that the after cooling coil 14 is so selected that the air leaving this coil assumes a dry bulb temperature of 60°, a wet bulb temperature of 57°, and a dew-point temperature of 55°. From the above it is seen that the precooling coil 13 is utilized primarily for sensible cooling and that the after cooling coil 14 is utilized primarily for latent cooling. The reheat coil 15 is assumed to be so selected that the condition of the air leaving the same will have a dry bulb temperature of 75°, a wet bulb temperature of 62.5° and a dew-point temperature of 55°. In other words, the reheat coil 15 adds sensible heat to the air to prevent the dry bulb temperature of the air entering the enclosure from becoming too low.

If 1,000 pounds per minute of outside air is utilized, then the precooling coil 13 removes substantially 17,000 B. t. u. per minute primarily in the form of sensible cooling, the after cooling coil 14 removes substantially 4,000 B. t. u. per minute primarily in the form of latent cooling and the reheating coil 15 adds substantially 3,750 B. t. u. per minute in the form of sensible heating. In other words, the reheat coil 15 adds sensible heat substantially equivalent to the latent heat removed by the after cooling coil 14.

Cooling water is supplied to the precooling coil 13 from a relatively warm evaporator generally designated at 16, cooling water is supplied to the after cooling coil 14 from a relatively cold evaporator generally designated at 17 and reheating water is supplied to the reheat coil 15 from a cooling tower generally designated at 18.

The relatively warm evaporator 16 may comprise a chamber 20 in which cooled water is collected. This cooled water is withdrawn from the chamber 20 through a pipe 21 by a pump 22 and delivered through a pipe 23 to the precooling coil 13 and for purposes of illustration it is assumed that the temperature of the water supplied by the evaporator 16 to the precooling coil 13 is substantially 60°. The cooling water is returned from the precooling coil 13 through a pipe 24 and a spray 25 to the evaporator chamber 20 and for purposes of illustration it is assumed that the temperature of this water is substantially 85°. A multi-stage centrifugal compressor 27 shown to be of the three stage type is connected by a pipe 28 to the evaporator chamber 20 for reducing the pressure in the chamber 20 and for withdrawing vapor from the chamber 20 whereby some of the water sprayed from the spray 25 is evaporated to cool the remainder of the water by evaporation. The multi-stage centrifugal compressor 27 discharges through a pipe 29 into a condenser 30 and for purposes of illustration it is assumed that the centrifugal compressor is so selected and that the condensing temperature in the condenser 30 is such that the temperature of the water in the evaporator chamber 20 will assume a temperature of substantially 60°. Although a three-stage centrifugal compressor has been shown for purposes of illustration it may be a single stage compressor or may have any number of stages and still remain within the contemplation of this invention. The centrifugal compressor 27 is shown to be driven by a multi-stage steam turbine shown as a three-stage steam turbine 31 and here again the three-stage steam turbine may be of the single stage type or may contain any number of stages. Steam is supplied to the steam turbine 31 through a steam supply line 32 leading from some source of steam (not shown) and the supply of steam to the steam turbine 31 may be controlled by a motorized valve 33 preferably of the proportioning type. The steam turbine 31 discharges through a pipe 34 into a condenser 35. Make up water is supplied to the evaporator chamber 20 to make up for the water lost through evaporation through a pipe 37 leading from some source of water (not shown). The supply of make up water may be controlled by a valve 38 which in turn is controlled by a float 39 responsive to the level of the water in the chamber 20. The float operated valve 38 therefore maintains the level of the water in the chamber 20 at substantially a constant value at all times.

The relatively cold evaporator 17 may comprise a chamber 41 for collecting cold water. This cold water is withdrawn from the chamber 41 through a pipe 42 by a pump 43 and is discharged through a pipe 44 into the after cooling coil 14 and for purposes of illustration it is assumed that the temperature of the water supplied to the after cooling coil 14 is substantially 50°. The cooled water returns from the after cooling coil 14 through a pipe 45 and through a spray 46 to the evaporator chamber 41 and for purposes of illustration it is assumed that the temperature of this water is substantially 60°. It is here noted that the cooling water is supplied to the cooling coils 13 and 14 at the down-stream side thereof so that a counter-flow heat exchange between the cooling water and the air being cooled is obtained. This greatly increases the cooling effect of the cooling coils on the air and increases the spread of the water temperatures.

A multi-stage centrifugal compressor 48 is connected by a pipe 49 to the evaporator chamber 41 for lowering the pressure therein and for exhausting vapor therefrom so that some of the water emanating from the sprays 46 is evaporated to cool the remaining water. The centrifugal compressor 48 discharges through a pipe 50 into a condenser 51. For purposes of illustration it is assumed that the temperature of the condenser 51 and the construction of the centrifugal compressor 48 are such that the water in the evaporator chamber 41 is cooled to a value of substantially 50°. The centrifugal compressor 48 is operated by a multi-stage steam turbine 52 receiving a supply of steam through a steam pipe 53 leading from some source of steam (not shown). A motorized valve 54 preferably of the proportioning or modulating type regulates the supply of steam to the steam turbine 52. The steam turbine 52 discharges through a pipe 55 into a condenser 56. Here again, the centrifugal compressor 48 and the steam turbine 52 are shown to be three-stage units but as pointed out above, these units may be of the single stage type or may have any number of stages. Make up water is supplied to the evaporator chamber 41 through a water pipe 58 under the control of a valve 59 which in turn is controlled by a float 60 to supply water to the evaporator chamber 41 to make up for water evaporated therein and hence to maintain the level of water in the evaporator chamber 41 at a substantially constant value.

The cooling tower generally designated at 18 may comprise a vertical chamber 62 provided with air inlet openings 63 near the bottom thereof. A fan 64 draws air, which may be outside air, through the openings 63 upwardly through the tower and discharges it to atmosphere. The air as it travels upwardly through the tower is contacted by water sprayed from a plurality of sprays for cooling the water and eliminator plates 65 may be provided for preventing moisture from passing into the fan 64. Make up water may be supplied to the lower portion of the cooling tower through a pipe 66 leading from some source of water (not shown) and the supply of make up water may be controlled by a valve 67 which in turn is controlled by a float 68. The float valve 67 therefore maintains the level of the water in the lower part of the cooling tower at a substantially constant value.

Water is withdrawn from the bottom of the cooling tower 18 through a pipe 70 by a pump 71 and is discharged through pipes 72, 73, 74, and 75, a motorized valve 76 preferably of the proportioning or modulating type and a pipe 77 to the reheat coil 15 and for purposes of illustration it is assumed that the temperature of this water is substantially 85°. This water gives up heat to the air passing over the reheat coil 15 and in so doing is cooled to a value, illustratively 70°, and this 70° water is discharged through a pipe 78 into a coil 79 in the condenser 51. The condensing temperature in the condenser 51 is therefore substantially 70° which enables the evaporator 17 to produce relatively cool water at substantially 50°.

Water flows from the coil 79 through a pipe 81 into an ejector 82 and condensed vapor in the condenser 51 is drawn therefrom through a pipe 83 by a pump 84 and is discharged into the ejector 82 by a pipe 85. The ejector 82 therefore mixes water leaving the coil 79 and water leaving the condenser 51 and this water is discharged, illustratively at 90°, through a pipe 86 to one of a plurality of sprays 87, 88 and 89 located in the cooling tower 18. Solenoid valves 90, 91, and 92 determine which spray shall be operated to spray the water into the cooling tower 18. For reasons to be pointed out more fully hereafter, it is desirable to spray the water into the tower at a point where the temperature of the water corresponds substantially to the wet bulb temperature of the air rising upwardly through the cooling tower at the point at which it is admitted. For example, if the temperature of the water is substantially 90°, as illustrated, and the wet bulb temperature of the air just above the spray 89 is substantially 90° then the valve 92 is operated to cause the spray 89 to become operative to spray water into the cooling tower 18. If on the other hand the wet bulb temperature of the air just above the spray 88 should be substantially 90° then the spray 88 would become operative to spray water into the cooling tower. Also if the wet bulb temperature of the air just above the spray 88 should be, say 85°, and the temperature of the water returning from the ejector 82 should be substantially 85°, then the valve 91 would be operated to cause the spray 88 to spray the 85° water into the cooling tower. The same operation holds true for the spray 87 and the valve 90. Summing up the sprays 87, 88, and 89 are so controlled that the water is supplied to the tower at a level dependent upon the temperature of the water and the wet bulb temperature of the air rising through the tower 18, the arrangement being such that the temperature of the water and the wet bulb temperature of the air substantially coincide at the point of entry of the water into the cooling tower. If under severe load conditions all of the valves 90, 91, and 92 should be closed then the pressure relief valve 93 would open to cause the water to be sprayed into the cooling tower 18 by the spray 89 or by another spray (not shown) which preferably would be located above the spray 89.

Water is also delivered by the pump 71 from the cooling tower 18 at 85° through pipes 72, 73, and 95 into a coil 96 located in the condenser 30. Accordingly the condensing temperature of the condenser 30 is substantially 85° and therefore the evaporator 16 operating at a higher condensing temperature cools the water to only 60° as illustrated. Water is discharged from the coil 96 through a pipe 97 into an ejector 98 and condensed vapor is withdrawn from the condenser 30 by a pump 99 and is discharged through a pipe 100 into the ejector 98. Accordingly the ejector 98 mixes the water leaving the coil 96 and the condensed vapor leaving the condenser 30 and this water is discharged at illustratively 95° through pipe 101 to a spray 102 located in the cooling tower 18 above the sprays 87, 88, and 89.

Water from the cooling tower 18 at 85° is also supplied by the pump 71 through pipes 72 and 105 to a coil 106 located in the condenser 35 and water is discharged from the coil 106 through a pipe 107 into an ejector 108. A pump 110 withdraws condensed steam from the condenser 35 through pipe 109 and discharges this steam through a pipe 111 into the ejector 108. The condensing water and the condensed steam are therefore mixed in the ejector 108 and the mixture is discharged, illustratively at 115°, through pipes 113 and 114 into one of a plurality of sprays 115, 116, and 117 located in the cooling tower 18 above the spray 102. Solenoid valves 118, 119, and 120 determine which spray shall spray this water into the cooling tower 18 and here again, as pointed out above, the sprays 115, 116, and 117 are selectively rendered operative to spray the water into the tower at a level wherein the temperature of the water corresponds to the wet bulb temperature of the air rising through the cooling tower 18. If load conditions should become extremely severe so that all of the valves 118, 119, and 120 should be closed then the water passes through a pressure relief valve 121 into the upper spray 117 or into an additional spray (not shown) located above the spray 117.

Water at illustratively 85° is supplied from the cooling tower 18 by pump 71 through pipes 72, 73, 74, and 125 into a coil 126 located in the condenser 56 for condensing the steam discharged from the steam turbine 52. Water flows from the coil 126 through a pipe 127 into an ejector 128 and condenser steam is withdrawn from the condenser 56 through a pipe 129 by a pump 130 and is discharged through a pipe 131 into the ejector 128. The condensed water and the condensed steam are therefore mixed in the ejector 128 and this mixture at illustratively 115° passes through pipes 132 and 114 into one of the sprays 115, 116, and 117.

In addition to evacuating condensate from the condensers 30, 35, 51, and 56 air must also be evacuated therefrom to maintain desired vacuum conditions therein. This may be accomplished in any well known manner either by providing separate air evacuators, not shown, or by constructing the pumps 99, 110, 84, and 130 so that they will remove and vent the air to atmosphere while discharging the condensate to their respective ejectors.

The motorized steam valve 33 which controls the supply of steam to the steam turbine 31 and hence which controls the evacuation of the evaporator 16 and the temperature of the water therein may be controlled by a temperature responsive controller 136 responsive to the temperature within the enclosure 10, a temperature responsive controller 137 responsive to the temperature of the air discharged from the precooling coil 13 and by a liquid level controller 138 responsive to the level of the water in the relatively warm evaporator 16. The temperature responsive controller 136 operates as the primary control of the steam valve 33 to position modulatingly the same to maintain the temperature within the enclosure between, illustratively, 75° and 85°. The temperature responsive controller 137 acts as a secondary or limit control for modulatingly positioning the steam valve 33 to close off the steam valve if the temperature of the air leaving the precooling coil decreases below 65° until such time as the temperature decreases to 60° at which time the valve 33 will become completely closed. This effectively prevents the temperature of the precooling coil 13 from becoming too low whereby the precooling coil 13 acts primarily to remove sensible heat and not latent heat. If for some reason the level of the water in the relatively warm evaporator 16 should increase to a high value with the danger of water entering the centrifugal compressor 27, the liquid level controller 138 will close off the steam valve 33 to prevent operation of the water vapor compressor 27. This effectively prevents breakage of the water vapor compressor 27 which might be caused by water in a liquid state entering the same.

The steam valve 54 which controls the supply of steam to the steam turbine 52 and hence which controls the evacuation of the relatively cold evaporator 17 and the temperature of the water therein is controlled by a humidity responsive controller 140 responsive to relative humidity conditions within the enclosure 10 and is also controlled by a liquid level controller 141 responsive to the level of the water in the relatively cold evaporator 17. As the relative humidity of the air within the enclosure 10 increases the valve 54 is modulatingly opened and as the relative humidity decreases the valve 54 is modulatingly closed and for purposes of illustration it is assumed that the humidity controller 140 maintains the relative humidity within the enclosure between 45% and 60%. As the valve 54 is opened upon an increase in relative humidity to lower the temperature of the after cooling coil 14 the valve 76 is moved towards an open position a like amount to increase the amount of sensible heat supplied to the air passing over the reheat coil 15. Accordingly as the relative humidity increases the amount of latent cooling and the amount of sensible heating are increased whereby sensible heat is added to replace the latent heat removed. With such an arrangement the relative humidity of the air within the enclosure 10 may be effectively regulated without disturbing to any great extent the dry bulb temperature conditions within the enclosure 10. The liquid level controller 141 performs the same function as the liquid level controller 138, namely, stopping operation of the steam turbine 52 and the centrifugal compressor 48 if the level of the water in the evaporator 17 should rise to a value which would endanger the centrifugal compressor 48.

The valves 90, 91, and 92 which control the operation of sprays 87, 88, and 89 are controlled by a temperature responsive controller 143 connected by a capillary tube 144 to a bulb 145 responding to the temperature of the water in the pipe 86. The valves 90, 91, and 92 are also respectively controlled by thermostats 146, 147, and 148, responsive to the wet bulb temperature of the air above the sprays 87, 88, and 89 respectively. The temperature responsive controller 143 and the thermostats 146, 147 and 148 operate to provide the above outlined sequence of operation, namely admitting water to the cooling tower at a level wherein the temperature of the water corresponds substantially to the wet bulb temperature of the air rising through the cooling tower 18.

The solenoid valves 118, 119, and 120 are controlled by a temperature responsive controller 150 which is connected by a capillary tube 151 to a bulb 152 containing a volatile fluid and responsive to the temperature of the water in the pipe 114. The valves 118, 119, and 120 are also respectively controlled by thermostats 153, 154, and 155 responsive to the wet bulb temperature of the air above the sprays 115, 116, and 117, respectively. The temperature responsive controller 150 and the thermostats 153, 154, and 155 operate to cause the water to be admitted to the cooling tower 18 at a point wherein the temperature of the water and the wet bulb temperature of the air rising through the cooling tower 18 are substantially the same.

It is here noted that the temperature of the precooling coil 13 is maintained at a relatively high value so that it will perform substantially only sensible cooling, and this is brought about by using relatively warm condensing water in the condenser 30. The temperature of the after cooling coil 14 is lower than the temperature of the precooling coil 13 so that the after cooling coil 14 performs primarily latent cooling and this is brought about by using relatively cool condensing water in the condenser 51. In other words, colder water is supplied to the condenser 51 than is supplied to the condenser 30 and this water is cooled this additional amount by the reheating action of the reheat coil 15. Accordingly, the water from the cooling tower which is utilized for reheat purposes dissipates heat to the air during the reheating process whereby the temperature of this water is lowered and this water at lower temperature is utilized for obtaining lower temperatures in the relatively cold evaporator 17 without the expenditure of additional energy. This system, therefore, provides a most economical mode of operation for obtaining desired dry bulb and relative humidity conditions within the enclosure 10. By admitting water of higher temperatures at progressively higher levels in the cooling tower 18 a counter flow heat exchange is obtained in the cooling tower 18 and therefore the efficiency of the same is greatly increased. By admitting water into the cooling tower 18 at levels wherein the temperature of the water admitted corresponds substantially to the wet bulb temperature of the air, the efficiency of the cooling tower 18 is further increased and the cooling tower will operate at all times to obtain the coldest water obtainable with existing outside wet bulb temperatures. By reason of the cooling tower arrangement of this invention a smaller tower with a lesser amount of air flow therethrough may be utilized for performing a predetermined amount of cooling therein.

Figure 2 is a diagrammatic illustration of the manner in which the temperature responsive controllers 136 and 137 and the liquid level responsive controller 138 control the operation of the motorized steam valve 33. The motor of the motorized steam valve 33 may be of the type shown and described in Patent No. 2,028,110 granted to D. G. Taylor on January 14, 1936. Power is supplied to the proportioning motor by line wires 160 and 161 leading from some source of power (not shown) and the proportioning motor is provided with control terminals 162, 163, and 164. The oppositely acting relay coils and the balancing potentiometer contained within the proportioning motor are connected across the control terminals 162 and 164 and the junction of the oppositely acting relay coils are connected to the control terminal 163, all as illustrated in the above referred to D. G. Taylor patent. When the external resistance across the terminals 162 and 163 becomes less than the external resistance across the terminals 163 and 164 the valve 33 is moved towards an open position and when the external resistance across the terminals 163 and 164 becomes less than the external resistance across the control terminals 162 and 163 the valve 33 is moved towards a closed position.

The temperature responsive controller 136 may comprise a bellows 166 charged with a volatile fluid for operating a lever 167 against the action of an adjustable tension spring 168. The lever 167 in turn operates a slider 169 with respect to a resistance element 170 and for purposes of illustration it is assumed that when the temperature is 75°, the slider 169 assumes an extreme right hand position and as the temperature increases to 80° the slider 169 is progressively moved to the left until it assumes an extreme left hand position.

The temperature responsive controller 137 responsive to the temperature of the air leaving the precooling coil 13 may comprise a bellows 172 charged with a volatile fluid for operating a lever 173 against the action of an adjustable tension spring 174. The lever 173 operates a slider 175 with respect to a resistance element 176 and for purposes of illustration it is assumed that the slider 175 assumes an extreme left hand position when the temperature is substantially 65° and is moved progressively to the right as the temperature decreases to a value of 60° whereupon the slider 175 assumes an extreme right hand position.

The liquid level controller 138 may comprise a pivoted lever 178 operated by a float 179. The lever in turn operates a mercury switch 180 provided with electrodes 181, 182, 183, and 184. When the level of the water in the evaporator chamber 20 is normal the electrodes 183 and 184 are bridged but if the level of the water should become abnormally high then the electrodes 181 and 182 are bridged.

The control terminal 162 is connected by wires 186 and 187 to the left end of the resistance element 170 and the control terminal 164 is connected by wires 188, 190 and 191 to the right end of the resistance element 170. The control terminal 164 is also connected by wires 188 and 189 to the right end of the resistance element 176. The control terminal 163 is connected by a wire 192 to the electrodes 182 and 183 and the electrode 184 is connected by wires 193 and 194 to the slider 175. The left end of the resistance element 176 is connected by a wire 195 to the slider 169. A resistance element 196 is connected between wires 186 and 193 to counteract the effect of the resistance 176 when the slider 175 is in the extreme left hand position as shown in Figure 2. The electrode 181 of the mercury switch 180 is connected by wires 197, 190, and 188 to the control terminal 164.

With the parts in the position shown it is seen that the resistance element 170 of the temperature responsive controller 136 is connected across the terminals 162 and 164 and that the slider 169 is connected directly to the control terminal 163. Hence the motorized valve 133 is under the control of the temperature responsive controller 136 and since the slider 169 thereof is in a mid-position the motorized valve 133 is likewise in a mid-position. As the temperature increases the slider 169 is moved towards the left to move the motorized valve 133 towards an open position and as the temperature decreases the slider 169 is moved towards the right to move the valve 33 towards a closed position. Accordingly the motorized valve 33 is modulatingly positioned between an open and closed position as the temperature within the enclosure 10 varies between 75° and 80° to maintain desired dry bulb temperature condition within the enclosure 10. If now the temperature of the air leaving the precooling coil 13 should decrease below 65° the slider 175 of the temperature responsive controller 137 moves toward the right and in so doing it does two things, it gradually decreases the external resistance across the control terminals 163 and 164 to move the motorized valve 33 towards a closed position and it adds resistance in series with the slider 169 of the temperature responsive controller 136 to decrease the sensitivity thereof. Accordingly as the temperature leaving the precooling coil 13 decreases from 65° to 60° the motorized valve 33 is graduatingly positioned towards a closed position. In this manner lowering of the temperature of the precooling coil 13 to a value which would cause latent cooling is effectively prevented. If the level of the water in the evaporator chamber 20 should become abnormally high a substantially complete short circuit across the control terminals 163 and 164 is completed and this circuit may be traced from the control terminal 163 through wire 192, electrodes 182 and 181 and wires 197, 190, and 188 back to the other control terminal 164. This causes complete closing movement of the motorized valve 33 to stop operation of the water vapor compressor 48 whereby damage to the compressor is effectively prevented.

Figure 3 illustrates the manner in which the humidity responsive controller 140 and the liquid level responsive controller 141 controls the operation of the motorized steam valve 54 and the motorized valve 76. Here again the motor of the motorized steam valve 54 may be of the type shown and described in the above referred to D. G. Taylor patent and it is supplied with power from line wires 200 and 201 leading from some source of power (not shown). The proportioning motor 54 is provided with control terminals 202, 203, and 204 for controlling the direction and extent of movement of the motorized valve.

The humidity responsive controller 140 may comprise a hygroscopic element 206 for operating a lever 207 against the action of an adjustable tension spring 208. The lever 207 in turn operates a slider 209 with respect to a resistance element 210 and for purposes of illustration it is assumed that when the relative humidity is 60% the slider 209 assumes an extreme left hand position and as the relative humidity decreases from 60% to 45% the slider 209 is progressively moved to the right across the resistance element 210.

The liquid level responsive controller 141 may comprise a pivoted lever 212 operated by a float 213 for operating a mercury switch 214 having electrodes 215, 216, 217, and 218. When the level of the water in the evaporator chamber 41 is normal the electrodes 215 and 216 are bridged. The control terminal 202 is connected by a wire 220 to the left end of the resistance element 210 and the control terminal 204 is connected by wires 221 and 222 to the right end of the resistance element 210. The control terminal 203 is connected by wire 223, electrodes 217 and 218 and wire 224 to the slider 209. The electrode 215 of the mercury switch 214 is connected by wires 225 and 221 to the control terminal 204.

With the parts in the positions shown in Figure 3 the control potentiometer formed by the slider 209 and the resistance element 210 is connected directly to the control terminals 202, 203, and 204 and since the slider 209 is in a mid-position the motorized valve 54 is in a mid-position. As the relative humidity increases the slider 209 is moved to the left to graduatingly open the motorized valve 54 and as the relative humidity decreases the slider 209 is moved toward the right to graduatingly close the motorized valve 54. Accordingly the valve 54 is modulatingly positioned in accordance with variations in relative humidity within the enclosure 10 to maintain the relative humidity within the enclosure 10 within predetermined limits, illustratively 60% and 45%. If the level of the water in the evaporator chamber 41 should become dangerously high the electrodes 215 and 216 are bridged to substantially short-circuit the control terminals 203 and 204 whereupon the motorized valve 54 is moved to a closed position. This, as pointed out above, effectively prevents damage to the centrifugal compressor 48.

The motorized valve 54 operates a dual potentiometer contained within a suitable housing 227 and this dual potentiometer is suitably connected to control terminals 228, 229 and 230 of the motorized valve 76 which may also be of the type shown and described in the above referred to D. G. Taylor patent. Power is supplied to the proportioning motor 76 by means of line wires 231 and 232 leading from some source of power (not shown). The connections are so arranged that as the motorized valve 54 is graduatingly opened and closed the motorized valve 76 is also graduatingly opened and closed in like amounts. Hence as the relative humidity increases the valve 54 is opened to increase the evacuation of the relatively cold evaporator 17 and the valve 76 is opened to increase the amount of reheat performed by the reheat coil 15 whereby the amount of dehumidification is increased without materially affecting the dry bulb temperature within the enclosure 10.

Referring now to Figure 4 the temperature responsive controller 143 which responds to the temperature of the water in the pipe 86 may comprise a bellows 235 connected by the capillary tube 144 to the bulb 145 for operating a switch arm 236 against the action of an adjustable tension spring 237. The switch arm 236 is adapted to progressively move across contacts 238, 239, and 240 and for purposes of illustration it is assumed that the switch arm 236 engages the contact 238 when the temperature of the water is substantially 90°, that it engages the contact 239 when the temperature of the water is substantially 85°, and that it engages the contact 240 when the temperature of the water is substantially 80°.

The thermostat 146 may comprise a bellows 242 charged with a volatile fluid for operating a switch arm 243 against the action of an adjustable tension spring 244. The switch arm 243 is adapted to engage contacts 245, 246, and 247 and for purposes of illustration it is assumed that the switch arm 243 engages the contact 245 at substantially 80°, that it engages the contact 246 at substantially 85°, and that it engages the contact 247 at substantially 90°. The structure of the thermostats 147 and 148 is exactly the same as that of the thermostat 146 and therefore like reference characters for like parts have been utilized.

Power is supplied to the control system by means of line wires 250 and 251 leading from some source of power (not shown), the line wire 250 connecting to the switch arm 236 of the temperature responsive controller 143 and the line wire 251 connecting by wires 252 to the solenoid valves 90, 91, and 92. The switch arms 243 of the thermostats 146, 147, and 148 are connected to their associated solenoid valves 90, 91, and 92 respectively, by wires 253. The contacts 238, 239, and 240 of the temperature responsive controller 143 are connected to busses 254, 255, and 256, respectively, and these busses are in turn respectively connected to the contacts 247, 246, and 245 of the thermostats 146, 147, and 148.

With the parts in the position shown in Figure 4 the temperature of the water in the pipe 86 is substantially 90° and the wet bulb temperature of the air rising through the tower 18 is substantially 90° at a point adjacent the thermostat 148. A circuit is thereupon completed from the line wire 250 through switch arm 236, contact 238, buss 254, contact 247 and switch arm 243 of the thermostat 148, wire 253, solenoid valve 92, and wire 252 back to the other line wire 251. Accordingly the solenoid valve 92 is opened and the 90° water in the pipe 86 is discharged through the spray 89 in contact with air which has a wet bulb temperature of substantially 90°. The other solenoid valves 90 and 91 are closed. If the wet bulb temperature of the air rising through the cooling tower should be 90° adjacent the thermostat 147, then the solenoid valve 91 would open and the solenoid valve 92 would close to cause the spray 88 to introduce the 90° water into the tower, at a level wherein the wet bulb temperature is substantially 90°. Likewise, if the wet bulb temperature adjacent the thermostat 146 should be 90°, then the solenoid valve 90 would open and the solenoid valve 91 would close to render the spray 87 operative. If now due to a decrease in cooling load the temperature of the water in the pipe 86 should decrease to 85° and the temperature adjacent the thermostat 147 should be 85°, then the valve 91 would open whereby the spray 88 would operate to admit the 85° water at that point in the cooling tower where the wet bulb temperature of the air rising through the cooling tower is substantially 85°. If under these reduced load conditions the wet bulb temperature adjacent the thermostat 148 should be 85°, then the spray 89 would be operated to spray the 85° water into the tower 18 or if the temperature adjacent the thermostat 146 should be 85° then the spray 87 would be operated to spray 85° water into the tower 18. The same sequence of operation holds true if the temperature of the water in the pipe 86 should be 80°.

From the above it is seen that the control system of Figure 4 operates at all times to cause the water flowing through the pipe 86 to be admitted into the cooling tower at a level wherein the temperature of the water is substantially the same as the wet bulb temperature of the air rising through the tower. This is an extremely important feature of this invention since it allows the air rising through the tower to perform the maximum amount of cooling at all times. To illustrate this point assume that the temperature of the water in the pipe 86 is 85° and that the wet bulb temperature of the air adjacent the spray 88 is 85°. As the air rises through the tower it picks up heat from the water emanating from the sprays and accordingly the wet bulb temperature of the air progressively increases as the air rises. The wet bulb temperature of the air adjacent the spray 89 will therefore be above 85° and the wet bulb temperature of the air adjacent the spray 87 will therefore be below 85°. The water falling from the sprays 102 and 115, 116 or 117 is being cooled by the air and will assume values substantially corresponding to the wet bulb temperatures of the air at the various levels in the tower. If now the 85° water flowing through the pipe 86 should be admitted to the tower through the spray 89, it will be cooler than the wet bulb temperature of the air at this level. This water will therefore absorb heat from the air and accordingly it will be heated up which is just the opposite action to that desired. Further, by admitting the 85° water to the tower at this point the air rising through the tower will have less chance to cool the water falling from the upper sprays 102 and 115, 116 or 117 to as great an extent than if this water was not so admitted, since the air will not contact the falling water for as long a period of time. In other words, admitting the 85° water at this level cuts short the cooling action of the rising air on the water falling from the sprays 102 and 115, 116 or 117. If on the other hand the 85° water is admitted to the tower through spray 87 then it will not be contacted by the rising air sufficiently long to decrease the temperature thereof to the desired minimum.

If now the 85° water is admitted to the tower through spray 88 it will not absorb heat from the rising air since the temperature thereof is substantially the same as the wet bulb temperature of the air at that level and it will allow the rising air to cool a maximum amount of the water falling from the sprays 102 and 115, 116 or 117. Further this water will contact the rising air sufficiently long to decrease the temperature thereof to the desired minimum. Accordingly the efficiency of the cooling tower is greatly increased by this method of operation and smaller cooling towers with a smaller flow of air therethrough may be utilized for accomplishing a predetermined amount of cooling.

The wiring of the control system of Figure 4 may also be utilized for controlling the solenoid valves 118, 119 and 120 in the upper part of the tower to admit water to the upper part of the tower at levels wherein the temperature of the water corresponds to the wet bulb temperature of the air. Of course different temperature settings of the thermostats 153, 154 and 155 and the temperature responsive controller 150 will be utilized but the sequence of operation will be substantially the same and therefore a further description of the operation is not considered necessary. It is found that some of the water admitted to the tower by the sprays is carried upwardly within the air in the form of a mist to the eliminator plates and then drops down through the air in the form of relatively heavy drops. A double cooling action by the air is therefore provided namely cooling the mist and cooling the drops. Accordingly, when the sprays 115, 116 and 117 are controlled in the manner pointed out above this double cooling action becomes more pronounced as the level at which the water is admitted is lowered. This sequence of operation therefore affords still greater economies in the operation of the tower.

Summing up, by spraying water into the tower at levels corresponding to the temperature of the water, that is by spraying the warmer water into tower at the upper portion thereof and the cooler water into the tower at the lower portion thereof, a counterflow heat exchange takes place between the water and the rising air which increases the efficiency of operation of the cooling tower. By admitting the water into the tower at levels wherein the temperature of the water corresponds to the wet bulb temperature of the rising air, the efficiency of operation of the tower is further increased. Accordingly, with the tower arrangement of this invention a maximum amount of cooling with a smaller tower and less air flow is made possible.

Figure 5 illustrates an arrangement wherein steam jet ejectors are utilized for cooling purposes instead of the steam driven centrifugal compressors as in Figure 1 and also in Figure 5 a different control arrangement is illustrated.

The enclosure to be air conditioned is designated at 260 and a fan 261 draws air through an air conditioning unit 262 and discharges conditioned air into the enclosure 260. Either fresh air, return air, or a mixture of fresh air and return air passes over a precooling coil 263, an after cooling coil 264, and a reheat coil 265 all located in the air conditioning unit 262. Cool water is supplied to the precooling coil 263 by a relatively warm evaporator 266, cold water is supplied to the after cooling coil 264 by a relatively cold evaporator 267 and water is supplied to the reheat coil 265 by a cooling tower generally designated at 268. Here as in the previous modifications, a counterflow heat exchange is afforded between the air being conditioned and the water in the coils 263, 264, and 265 whereby the efficiency of the system is increased.

The relatively warm evaporator 266 may comprise a chamber 270 in which cool water is collected and this cool water is drawn from the chamber 270 through a pipe 271 by a pump 272 and is discharged through a pipe 273, a motorized valve 274, and a pipe 275 to the precooling coil 263. For purposes of illustration it is assumed that the temperature of the water supplied to the precooling coil 263 is substantially 60°. Water is withdrawn from the precooling coil 263 at, illustratively, 85° through a pipe 276 and is discharged through a spray 277 into the evaporator chamber 270. Part of the water thus sprayed is evaporated to cool the remainder of the water to substantially 60°. The evaporator chamber 270 is connected by a conduit 278 to a nozzle chamber 279 of a steam jet ejector 280. Steam is supplied to the nozzles of the steam ejector by a steam pipe 281 leading from some source of steam (not shown) and the supply of steam is regulated by a motorized valve 282. The steam jet ejector 280 discharges into a nozzle box 283 of a second ejector 284. Water is supplied to the nozzles of the second ejector by a pipe 285 and the water mixed with the steam and air ejected from the ejector 280 is collected in a hot well 286. For purposes of illustration it is assumed that the temperature of the water entering the nozzles through the pipe 285 is substantially 85° so that the temperature of the water obtained in the evaporator chamber 270 is substantially 60°. Make up water is supplied to the evaporator chamber 270 by means of a water pipe 287 leading from some source of water (not shown) and the supply of water is controlled by a valve 288 which in turn is controlled by a float 289 to maintain the level of the water in the evaporator chamber 270 substantially constant.

The relatively cold evaporator 267 may comprise an evaporator chamber 290 in which water is cooled and collected. A pump 292 withdraws cold water from the evaporator chamber 290 through a pipe 291 and discharges this cold water through a pipe 293 to the after cooling coil 264. For purposes of illustration it is assumed that the temperature of this water is substantially 50°. Water is discharged from the after cooling coil 264 through a pipe 294, illustratively, at 60° into a spray 295 located in the evaporator chamber 290. Part of the water sprayed out of the spray 295 evaporates to cool the remainder of the water. A conduit 296 connects the evaporator chamber 290 to a nozzle box 297 of a steam jet ejector 298. Steam is supplied to the nozzles in the nozzle box 297 through a steam pipe 299 leading from some source of steam (not shown) and the supply of steam is regulated by a motorized valve 300. The steam jet ejector 298 discharges into a nozzle box 301 of a second ejector 302 and water, illustratively, at 70° is supplied to the nozzles through a pipe 303. By reason of this 70° water it is possible to produce colder water (50°) in the evaporator chamber 290 than in the evaporator chamber 270. The steam from the ejector 298 is condensed and is collected along with the water coming from the pipe 303 and the air in a hot well 304. Make up water is supplied to the evaporator chamber 290 by a pipe 305 leading from some source of water (not shown) and the supply of make up water is controlled by a valve 306 which in turn is controlled by a float 307 to maintain the level of the water in the evaporator chamber 290 substantially constant. While steam valves 282 and 300 have been shown for controlling the evacuation of evaporators 266 and 267, the evacuation of the evaporators may equally as well be regulated by cutting in and cutting out in steps a plurality of steam jet ejectors and such is within the contemplation of this invention.

The cooling tower 268 may comprise a vertical chamber 310 provided adjacent its lower end with openings 311. A fan 312 draws air through the openings 311 and upwardly through the cooling tower to be discharged to atmosphere. The air in passing upwardly through the cooling tower contacts water sprayed from a plurality of sprays for cooling the water and moisture is prevented from entering the fan 312 by means of eliminator plates 313. Make up water is supplied to the cooling tower 268 through a water pipe 314 leading from some source of water (not shown) and the supply of make up water is regulated by a valve 315 which in turn is operated by a float 316 to maintain the level of the water in the bottom of the cooling tower 268 substantially constant.

For purposes of illustration it is assumed that the water in the cooling tower is cooled to substantially 85° and this 85° water is withdrawn from the cooling tower 268 through a pipe 320 by a pump 321 and is discharged through pipes 322 and 285 into the nozzle box 283 of the ejector of the relatively warm evaporator. By reason of this 85° water the temperature maintained in the evaporator 266 is cooled to illustratively, 60°. Water is withdrawn from the hot well 286 through a pipe 323 by a pump 324 and this water is discharged through a pipe 325 into a spray 326 located near the top of the cooling tower 268. For purposes of illustration it is assumed that the temperature of the water entering the spray 326 is substantially 100°.

The pump 321 also supplies 85° water from the cooling tower 268 through pipes 322 and 327, motorized valve 328, and pipe 329 to the reheat coil 265 and water is discharged from the reheat coil 265 at, illustratively, 70° through pipe 330, motorized valve 331, and pipe 303 into the nozzle box 301 of the ejector of the relatively cold evaporator 267. Water is withdrawn from the hot well 304 through a pipe 333 by a pump 334 and is discharged through a pipe 335 into one of a plurality of sprays 336, 337, and 338 located in the cooling tower 268. For purposes of illustration it is assumed that the temperature of this water is substantially 95°. The operation of the sprays 336, 337, and 338 is controlled by solenoid valves 339, 340, and 341, respectively, and the purpose of these valves is, as set out above, to admit the water at a level in the cooling tower 268 wherein the water temperature corresponds to the wet bulb temperature of the air rising through the cooling tower 268. If under severe load conditions when all three solenoid valves 339, 340, and 341 should be closed, then the pressure relief valve 342 opens to admit the water to the upper spray 338 or to spray 326 located above the spray 338.

The motorized steam valve 282 is controlled by a temperature responsive controller 344 responsive to the temperature of the air leaving the precooling coil 263 and for purposes of illustration it is assumed that this temperature responsive controller in controlling the motorized valve 282 maintains the temperature of the air leaving the precooling coil 263 between 60° and 64°. As the temperature increases the valve 282 is moved towards an open position and as the temperature decreases the valve 282 is moved towards a closed position. The motorized steam valve is also controlled by a temperature responsive controller 450 connected by a capillary tube 451 to a bulb 452 charged with a volatile fluid and responsive to the temperature of the water in the pipe 273. When the temperature of the water in the pipe 273 is above 59°, the temperature responsive controller 344 controls the valve 282 but when the temperature of the water decreases below 59° the valve 282 is closed.

The motorized valve 300 controlling the operation of the relatively cold evaporator 267 is controlled by a temperature responsive controller 345 responsive to the temperature of the air leaving the after cooling coil 264 and this temperature responsive controller operates to maintain the temperature of the air at that point between substantially 59° and 62°. As the temperature increases the valve 300 is moved towards an open position to decrease the temperature of the water in the after cooling coil 264 and as the temperature decreases the valve 300 is moved towards a closed position to increase the temperature of the water in the after cooling coil. The temperature responsive controller 344 in addition to controlling the operation of the steam valve 282 also controls the operation of the steam valve 300 to close the steam valve 300 when the temperature of the air leaving the precooling coil 263 decreases to substantially 60°. When the temperature of the air leaving the precooling coil 263 decreases to 60° there is really no need for further cooling this air and therefore the relatively cold evaporator 267 and the after cooling coil 264 is rendered inoperative.

The motorized valve 274 which regulates the rate of flow of cooling water through the precooling coil 263 is controlled by a temperature responsive controller 346 responsive to the dry bulb temperature within the enclosure 260. As the temperature increases the valve 274 is moved towards an open position to increase the rate of flow whereby the air is cooled to a further extent by the precooling coil. As the temperature within the enclosure decreases the valve 274 is moved towards a closed position to throttle the flow of water through the precooling coil 263 whereby the air is cooled a lesser extent. For purposes of illustration it is assumed that the temperature responsive controller 346 operates to maintain the dry bulb temperature within the enclosure 260 between 75° and 80°.

The motorized valve 328 which regulates the flow of water through the reheating coil 265 is controlled by a humidity responsive controller 347 responsive to the relative humidity within the enclosure 260. Upon an increase in relative humidity the valve 328 is moved towards an open position to increase the amount of reheating accomplished by the reheat coil 265 and as the relative humidity decreases the valve 328 is moved towards a closed position to decrease the amount of heating by reheat coil 265. By increasing the amount of reheating the relative humidity of the air discharged into the enclosure 260 is decreased and therefore desired relative humidity conditions are maintained within the enclosure 260. For purposes of illustration it is assumed that the humidity responsive controller 347 operates to maintain the relative humidity conditions between 45% and 60%.

The valve 331 controlling the flow of water from the reheat coil 265 to the ejector of the relatively cold evaporator 267 is controlled by a temperature responsive controller 348 connected by a capillary tube 349 to a bulb 350 responsive to the temperature of the water in the pipe 330. Upon an increase in temperature of the water in the pipe 330 the valve 331 is moved towards a closed position and upon a decrease in temperature it is moved towards an open position. If the temperature of the water should increase, the condensing action of the ejector for the relatively cold evaporator would decrease and hence the temperature of the water cooled by the relatively cold evaporator would increase. In response to this increase in temperature of the water in the pipe 330 the valve 331 is moved towards the closed position to slow down the rate of circulation in the water through the reheat coil 265 whereupon the water is cooled to a greater extent which maintains the condensing temperature at a relatively low value. For purposes of illustration, it is assumed that the temperature responsive controller 348 maintains the temperature of the water in the pipe 330 between 60° and 70° so that water in the relatively cold evaporator 267 may be cooled to substantially 50°. Valve 331 in effect acts as a limit control for valve 328 to prevent fluctuation in enclosure relative humidity upon wide changes in enclosure dry bulb temperature.

Figure 6:
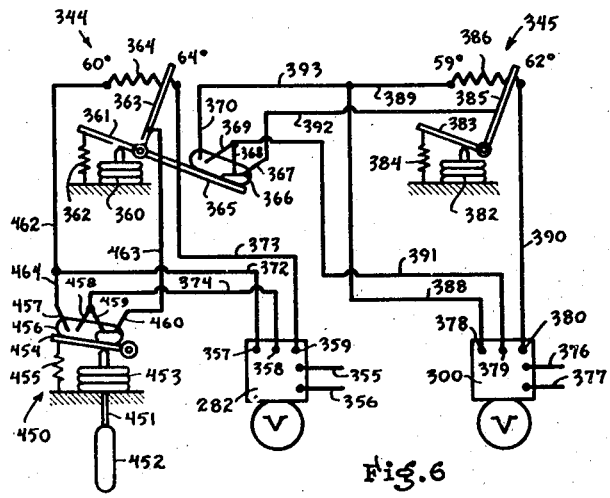

Figure 6 illustrates the manner in which the motorized valves 282 and 300 are controlled by the temperature responsive controllers 344 and 345. The motorized valve 282 may be operated by a proportioning motor which may be of the type shown and described in the above referred to D. G. Taylor patent. Power is supplied to the motorized valve 282 by means of line wires 355 and 356 leading from some source of power (not shown) and the motorized valve 282 may be provided with control terminals 357, 358, and 359.

The temperature responsive controller 344 may comprise a bellows 360 charged with a volatile fluid for operating a lever 361 against the action of an adjustable tension spring 362. The lever 361 operates a slider 363 with respect to a resistance element 364. The lever 361 may be provided with an extension 365 for operating a mercury switch 366 having electrodes 367, 368, 369, and 370. For purposes of illustration it is assumed that when the temperature of the air leaving the precooling coil 263 is at 64° the slider 363 is in the extreme right hand position and as the temperature progressively decreases, the slider 363 is moved progressively to the left until such time as the temperature decreases to 60° whereupon the slider 363 assumes an extreme left hand position. The electrodes 367 and 368 of the mercury switch 366 are normally bridged but when the temperature of the air leaving the precooling coil 263 decreases to 60° the electrodes 369 and 370 are bridged.

The temperature responsive controller 450 may comprise a bellows 453 connected to the bulb 452 by the capillary tube 451 for operating a lever 454 against the action of an adjustable tension spring 455. The lever in turn operates a mercury switch 456 having electrodes 457, 458, 459, and 460. For purposes of illustration it is assumed that the electrodes 459 and 460 are bridged when the water temperature is above 59° and that the electrodes 457 and 458 are bridged when the water temperature falls below 59°.

The control terminal 357 is connected by wires 372 and 462 to the left end of the resistance element 364, the control terminal 359 is connected by a wire 373 to the right end of the resistance element 364, and the control terminal 358 is connected by a wire 374 to the electrodes 458 and 459. The electrode 460 is connected by a wire 463 to the slider 363 and the electrode 457 is connected by wires 464 and 372 to the control terminal 357. With the parts in the position shown in Figure 6 the slider 363 is in the extreme right hand position and the motorized valve 282 is wide open. As the temperature decreases to move the slider 363 towards the left the motorized valve 282 is progressively moved towards a closed position. Accordingly the motorized valve 282 is positioned in accordance with the temperature of the air leaving the precooling coil 263. If the temperature of the water in the pipe 273 should fall below 59°, then the connection between the control terminal 358 and the slider 363 is broken and the control terminal 358 is connected through the electrodes 458 and 457 to the control terminal 357. This closes the steam valve 282 to prevent the production of too cold water by the temperature responsive controller 344 if the thermostat 346 has throttled the valve 274 to a relatively great extent.

The motorized valve 300 may also be operated by a proportioning motor of the type shown and described in the above referred to D. G. Taylor patent. Power is supplied to the motorized valve by means of line wires 376 and 377 leading from some source of power (not shown) and the motorized valve may be provided with control terminals 378, 379, and 380 for controlling the direction and extent of movement thereof.

The temperature responsive controller 345 may comprise a bellows 382 charged with a volatile fluid for operating a lever 383 against the action of an adjustable tension spring 384. The lever 383 operates a slider 385 with respect to a resistance element 386 and for purposes of illustration it is assumed that when the temperature of the air leaving the after cooling coil 264 is 62° the slider 385 is in the extreme right hand position as shown and as the temperature decreases the slider 385 is moved progressively to the left until such time as the temperature decreases to 59° whereupon the slider 385 assumes an extreme left hand position.

The control terminal 378 is connected by wires 388 and 389 to the left end of the resistance element 386 and the control terminal 380 is connected by a wire 390 to the right end of the resistance element 386. The control terminal 379 is connected by a wire 391 to the electrodes 368 and 369 of the mercury switch 366, the electrode 378 being connected by a wire 392 to the slider 385 and the electrode 370 being connected by wires 393 and 388 to the control terminal 378. With the parts in the positions shown in Figure 6 the slider 385 is in an extreme right hand position and the motorized valve 300 is wide open. As the temperature gradually decreases to move the slider 385 toward the left the motorized valve 300 is graduatingly positioned towards a closed position. Accordingly the motorized valve 300 is positioned in accordance with the position of the slider 385 as determined by the temperature of the air leaving the after cooling coil 264. If now the temperature leaving the precooling coil 263 should decrease to 60° the electrodes 378 and 368 are unbridged, and the electrodes 369 and 370 are bridged which completes a substantially short circuit across the terminals 378 and 379 to move the motorized valve 300 to a closed position. This also interrupts control of the motorized valve 300 by the temperature responsive controller 345. When the temperature of the air leaving the precooling coil 263 rises above 60°, say to 60½°, the mercury switch 366 is tilted to the position shown in Figure 6 to place the motorized steam valve 300 under the control of the temperature responsive controller 345.

Figure 7:
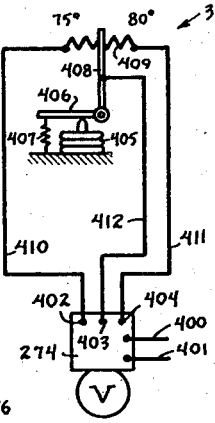

Figure 7 illustrates the manner in which the motorized valve 274 is controlled by the temperature responsive controller 346. Here again the motorized valve may be operated by a proportioning motor of the type shown and described in the above referred to D. G. Taylor patent and power is supplied to this motor by means of line wires 400 and 401 leading from some source of power (not shown). The motor is also provided with control terminals 402, 403, and 404. The temperature responsive controller 346 may comprise a bellows 405 charged with a volatile fluid for operating a lever 406 against the action of an adjustable tension spring 407. The lever 406 operates a slider 408 with respect to a resistance element 409 and for purposes of illustration it is assumed that the slider 408 sweeps progressively from left to right across the resistance element 409 as the temperature of the enclosure 260 increases from 75° to 80°.

The control terminal 402 is connected by wire 410 to the left end of the resistance element 409 and the control terminal 404 is connected by wire 411 to the right end of the resistance element 409. The control terminal 403 is connected by wire 412 to the slider 408 whereby the potentiometer formed by the resistance element 409 and the slider 408 is connected across the terminals 402, 403, and 404. Upon an increase in temperature the slider 408 moves to the right to move the valve 274 towards an open position and upon a decrease in temperature the slider 408 moves towards the left to move the valve 274 towards a closed position. Accordingly the valve 274 is modulatingly positioned in accordance with the temperature within the enclosure 260 to regulate the cooling effect of the precooling coil 263 which maintains desired temperature conditions within the enclosure 260.

Figure 8:
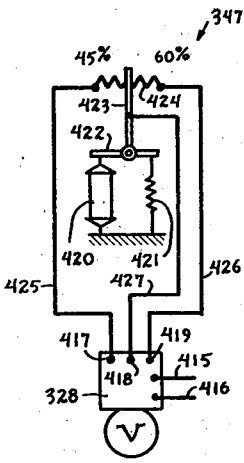

Figure 8 illustrates the manner in which the motorized valve 328 is graduatingly positioned by the relative humidity responsive controller 347 responsive to the relative humidity within the enclosure 260. The motorized valve 328 may be operated by a proportioning motor also of the type shown and described in the above referred to D. G. Taylor patent and power is supplied to this proportioning motor by means of line wires 415 and 416 leading from some source of power (not shown). The proportioning motor is also provided with control terminals 417, 418, and 419. The relative humidity responsive controller 347 may comprise a hygroscopic element 420 for operating a lever 422 against the action of an adjustable tension spring 421. The lever 422 operates a slider 423 with respect to a resistance element 424 and for purposes of illustration it is assumed that as the relative humidity within the enclosure 260 increases from 45% to 60% the slider 423 is progressively moved from an extreme left position to an extreme right position.

The control terminal 417 is connected by wire 425 to the left end of the resistance element 424 and the control terminal 419 is connected by a wire 426 to the right end of the resistance element 424. The control terminal 418 is connected by wire 427 to the slider 423. With the parts in the position shown the slider 423 is in a mid-position and hence the motorized valve 328 is in a mid-position. As the relative humidity increases the motorized valve 328 is graduatingly positioned towards an open position and as the relative humidity decreases the motorized valve is graduatingly positioned towards a closed position. Accordingly the relative humidity controller 347 modulatingly positions the motorized valve 328 to regulate the flow of water through the reheat coil 265 to maintain the relative humidity in the enclosure 260 between 45% and 60%.

Figure 9:
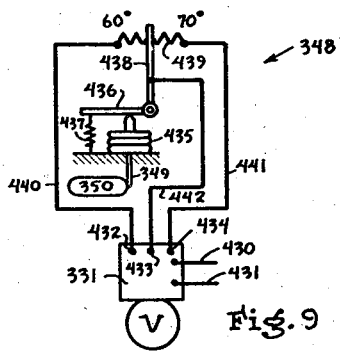

Figure 9 illustrates the manner in which the motorized valve 331 may also be operated by a proportioning motor which may be of the type shown and described in the above referred to D. G. Taylor patent and power is supplied to the proportioning motor by means of wires 430 and 431 leading from some source of power (not shown). The proportioning motor may also be provided with control terminals 432, 433, and 434 for controlling the direction and extent of movement of the motorized valve. The temperature responsive controller 348 may comprise a bellows 435 connected by the capillary tube 349 to the bulb 350 for operating a lever 436 against the action of an adjustable tension spring 437. The lever 436 operates a slider 438 with respect to a resistance element 439 and for purposes of illustration it is assumed that as the temperature of the water in the pipe 330 increases from 60° to 70° the slider 438 is moved progressively from an extreme left hand position to an extreme right hand position.

The control terminal 432 is connected by a wire 440 to the left end of the resistance element 439 and the control terminal 434 is connected by a wire 441 to the right end of the resistance element 439. The control terminal 433 is connected by a wire 442 to the slider 438. With the parts in the position shown in Figure 9 the slider 438 is in a mid-position and hence the motorized valve 331 is in a mid-position. As the temperature of the water increases the slider 438 is moved to the right to move the valve 331 towards a closed position and as the temperature decreases the slider 438 is moved towards the left to move the motorized valve 331 towards an open position. Accordingly the motorized valve 331 is positioned in accordance with the position of the slider 438 which in turn is positioned in accordance with the temperature of the water in the pipe 330. The temperature responsive controller 348 therefore maintains the temperature of the water in the pipe 330 between 60° and 70° so that relatively cold water may be produced in the relatively cold evaporator 267.

Figure 4 illustrates also the manner in which the solenoid valves 339, 340, and 341 of the cooling tower 268 may be controlled to admit water to the cooling tower at a level wherein the temperature of the water corresponds to the wet bulb temperature of the air rising through the cooling tower 268. As explained above, this greatly increases the efficiency of operation of the cooling tower 268 so that the coldest possible water is at all times produced thereby.

From the above it is seen that the modification shown by Figure 5 accomplishes generally substantially the same results as are accomplished by the modification shown in Figure 1. It is obvious that the control arrangement of Figure 5 may be applied to the modification of Figure 1 and likewise the control arrangement of Figure 1 may be applied to the modification of Figure 5. For purposes of illustration in this application, various temperature values have been assumed but it is obvious that these values may be varied to suit different types of installations.

Although for purposes of illustration two forms of this invention have been disclosed other forms thereof may become apparent to those skilled in the art upon reference to this disclosure and therefore this invention is to be limited only by the scope of the appended claims and prior art.

I claim as my invention:

1. In a cooling tower, the combination of, a substantially vertical chamber, means for circulating air upwardly through the chamber, upper and lower sprays in the chamber adapted to spray fluid in contact with the circulating air whereby the fluid is cooled and the air is heated, means for supplying fluid to the upper sprays from a source of relatively warm fluid, and means for supplying fluid to the lower sprays from a source of relatively cool fluid, whereby a counterflow heat exchange between the air and the fluid is provided, said lower sprays including a plurality of sprays spaced longitudinally in the chamber, and means for controlling the operation of the lower sprays to admit relatively cool fluid therethrough at a level wherein the temperature of the fluid corresponds substantially to the wet bulb temperature of the air.

2. In a cooling tower, the combination of, a substantially vertical chamber, means for circulating air upwardly through the chamber, upper and lower sprays in the chamber adapted to spray fluid in contact with the circulating air whereby the fluid is cooled and the air is heated, means for supplying fluid to the upper sprays from a source of relatively warm fluid, and means for supplying fluid to the lower sprays from a source of relatively cool fluid, whereby a counterflow heat exchange between the air and the fluid is provided, said lower sprays including a plurality of sprays spaced longitudinally in the chamber, means for controlling the operation of the lower sprays to admit relatively cool fluid therethrough at a level wherein the temperature of the fluid corresponds substantially to the wet bulb temperature of the air, said upper sprays including a plurality of sprays spaced longitudinally in the chamber, and means for controlling the operation of the upper sprays to admit relatively warm fluid therethrough at a level wherein the temperature of the fluid corresponds substantially to the wet bulb temperature of the air.

3. In a cooling tower, the combination of, a substantially vertical chamber, means for circulating air upwardly through the chamber, a plurality of sprays spaced longitudinally in the chamber adapted to spray a fluid in contact with the circulating air, and means for controlling the operation of the sprays to admit fluid through the sprays to the cooling tower at a level wherein the temperature of the fluid corresponds substantially to the wet bulb temperature of the air, said last mentioned means including means responsive to the temperature of the air adjacent each spray.

4. In a cooling tower, the combination of, a substantially vertical chamber, means for circulating air upwardly through the chamber, a plurality of sprays spaced longitudinally in the chamber adapted to spray a fluid in contact with the circulating air, means for controlling the operation of the sprays to admit fluid through the sprays to the cooling tower at a level wherein the temperature of the fluid corresponds substantially to the wet bulb temperature of the air, said last mentioned means including means responsive to the temperature of the air adjacent each spray, and means responsive to the temperature of the fluid.

5. In a cooling tower, the combination of, a substantially vertical chamber, means for circulating air upwardly through the chamber, a plurality of sprays spaced longitudinally in the chamber adapted to spray a fluid in contact with the circulating air, means for controlling the operation of the sprays to admit fluid through the sprays to the cooling tower at a level wherein the temperature of the fluid corresponds substantially to the wet bulb temperature of the air, said last mentioned means comprising a valve controlling the flow of fluid to each spray, a device adjacent each spray for sensing a temperature condition of the air, and a thermostat responsive to the temperature of the fluid, and means so relating said thermostat, devices, and valves so that an individual device opens its respective valve when the temperature adjacent that device corresponds to the temperature of the fluid.

6. In apparatus of the character described, in combination, means forming a chamber having a gas therein, means for introducing a fluid into the chamber at different levels, control means responsive to a psychrometric condition of the gas at said levels, the condition normally being different at the different levels, means responsive to the temperature of the fluid, and means whereby the level at which fluid is admitted depends upon a predetermined relationship between the value of the psychrometric condition of the gas at that level and the temperature of the fluid.

ROBERT B. P. CRAWFORD.